US006664672B2

(12) United States Patent
Kalsi et al.

(10) Patent No.: US 6,664,672 B2
(45) Date of Patent: Dec. 16, 2003

(54) ENHANCEMENT OF STATOR LEAKAGE INDUCTANCE IN AIR-CORE MACHINES

(75) Inventors: Swarn S. Kalsi, Shrewsbury, MA (US); Gregory L. Snitchler, Shrewsbury, MA (US)

(73) Assignee: American Superconductor Corporation, Westborough, MA (US)

(*) Notice: Subject to any disclaimer, the term of this patent is extended or adjusted under 35 U.S.C. 154(b) by 0 days.

(21) Appl. No.: 09/905,611

(22) Filed: Jul. 13, 2001

(65) Prior Publication Data

US 2003/0011273 A1 Jan. 16, 2003

(51) Int. Cl.[7] .............................. H02K 9/00
(52) U.S. Cl. .......................... 310/57; 310/54
(58) Field of Search ................ 310/52, 54, 57, 310/86

(56) References Cited

U.S. PATENT DOCUMENTS

| | | | |
|---|---|---|---|
| 4,176,292 A | 11/1979 | Kalsi et al. ............. | 310/52 |
| 4,442,393 A | 4/1984 | Abbondanti ............. | 318/802 |
| 4,914,328 A | * 4/1990 | Hooper et al. ........... | 310/52 |
| 5,774,032 A | * 6/1998 | Herd et al. .............. | 335/216 |
| 5,880,547 A | 3/1999 | Shoykhet ................ | 310/91 |
| 5,986,379 A | 11/1999 | Hollenbeck et al. ...... | 310/257 |
| 6,129,477 A | 10/2000 | Shoykhet ................ | 403/267 |

FOREIGN PATENT DOCUMENTS

| | | |
|---|---|---|
| EP | 0515469 B1 | 12/1992 |
| EP | 0783201 B1 | 7/1997 |

OTHER PUBLICATIONS

Salasoo et al., "Design and Analysis of a Novel Superconducting Gerator" Electric Machines and Drives Conference Record, 1997, IEEE International, May 1997, Milwaukee, WI.

Kleiner F et al., "Performance Characteristics and Design Criteria For High–Speed Adjustable Speed Drivers for Large Turbomachines" 36th Annaual Peteroleum and Chemical Industry Conference Record, Industrial Applications Society, Sep. 1989, San Diego, CA.

* cited by examiner

*Primary Examiner*—Dang Le
(74) *Attorney, Agent, or Firm*—Fish & Richardson P.C.

(57) ABSTRACT

A method of maintaining a desired level of sub-transient reactance in a superconducting machine includes specifying a desired level of sub-transient reactance. A stator assembly is produced that includes at least one stator coil assembly having a first predefined length. A rotor assembly is produced that is configured to rotate within the stator assembly. An asynchronous field filtering shield, having a second predefined length that is less than the first predefined length, is positioned between the stator assembly and the rotor assembly. The desired level of sub-transient reactance is achieved by adjusting either the first predefined length or the second predefined length.

6 Claims, 8 Drawing Sheets

150

ENHANCEMENT OF STATOR LEAKAGE INDUCTANCE IN AIR-CORE MACHINES

RELATED APPLICATIONS

The following applications are hereby incorporated by referenced into the subject application as if set forth herein in full: (1) U.S. application Ser. No. 09/632,599, filed Aug. 4, 2000, entitled "Superconducting Synchronous Machine Field Winding Protection"; (2) U.S. application Ser. No. 09/632,602, filed Aug. 4, 2000, entitled "Segmented Rotor Assembly For Superconducting Rotating Machines"; (3) U.S. application Ser. No. 09/632,600, filed Aug. 4, 2000, entitled "Exciter For Superconducting Rotating Machinery"; (4) U.S. application Ser. No. 09/632,601, filed Aug. 4, 2000, entitled "Stator Support Assembly For Superconducting Rotating Machines"; (5) U.S. application Ser. No. 09/480, 430, filed Jan. 11, 2000, entitled "Exciter and Electronic Regulator for Rotating Machinery"; (6) U.S. application Ser. No. 09/481,480, filed Jan. 11, 2000, entitled "Internal Support for Superconducting Wires"; (7) U.S. Ser. No. 09/480, 396, filed Jan. 11, 2000, entitled "Cooling System for HTS Machines", (8) U.S. application Ser. No. 09/415,626, filed Oct. 12, 1999, entitled "Superconducting Rotating Machine"; and (9) U.S. Application No. 60/266,319, file Jan. 11, 2000, entitled "HTS Superconducting Rotating Machine".

GOVERNMENT RIGHTS

This invention was made with U.S. government support under Contract No.: N00014-00-C-0486 awarded by the Office of Naval Research. The Government may have certain rights in the subject invention.

TECHNICAL FIELD

This invention relates to superconducting machines.

BACKGROUND

Superconducting air-core, synchronous electric machines have been under development since the early 1960's. The use of superconducting windings in these machines has resulted in a significant increase in the field electromotive forces generated by the windings and increased flux and power densities of the machines.

Early superconducting machines included field windings wound with low temperature superconductor (LTS) materials, such as NbZr or NbTi and later with $Nb_3Sn$. The field windings were cooled with liquid helium from a stationary liquifier. The liquid helium was transferred into the rotor of the machine and then vaporized to use both the latent and sensible heat of the fluid to cool the windings. This approach proved to be viable for only very large synchronous machines. With the advent of high temperature superconductor (HTS) materials in the 1980's, the cooling requirements of these machines were greatly reduced and smaller superconducting machines were realizable.

In superconducting machinery, efficiency and size are of critical importance. One way of reducing the size of a superconducting machine is to minimize the air gap between the field windings and the stator windings. Unfortunately, since superconducting rotor windings typically utilize some form of metallic shielding to minimize the detrimental affect of asynchronous fields in the stator windings, as this air gap is reduced, the stator windings get closer to this metallic shielding and subtransient reactance is reduced. This reduction in subtransient reactance results in higher levels of braking torque and stator current being experienced by the superconducting machine during fault conditions.

SUMMARY

According to an aspect of this invention, a superconducting rotating machine includes a stator assembly. This stator assembly includes at least one stator coil assembly having a first predefined length. A rotor assembly is configured to rotate within this stator assembly and is spaced from the stator assembly by a gap. The rotor assembly includes at least one superconducting rotor winding assembly that, in operation, generates a magnetic flux linking the stator assembly. The rotor assembly includes an asynchronous field filtering shield having a second predefined length that is less than the first predefined length. This shield is positioned between the stator assembly and the rotor assembly.

One or more of the following features may also be included. The asynchronous field filtering shield is constructed of a non-magnetic material, such as copper or aluminum. The first predefined length is a differential length greater than the second predefined length, such that this differential length may be a percentage of the first predefined length, a percentage of the second predefined length, or a fixed length. The stator coil assembly is constructed using copper non-superconducting material. The rotor winding assembly is constructed using a high-temperature superconducting material, such as: thallium-barium-calcium-copper-oxide; bismuth-strontium-calcium-copper-oxide; mercury-barium-calcium-copper-oxide; and yttrium-barium-copper-oxide. The superconducting machine further includes a refrigeration system for cooling the superconducting rotor winding assembly. The stator coil assembly includes a center section and a pair end-turn sections positioned at distal ends of the center section. The asynchronous field filtering shield is positioned between the center section of the stator coil assembly and superconducting rotor winding assembly. The end-turn sections of the stator coil assembly extend beyond the asynchronous field filtering shield.

According to a further aspect of this invention, a method of maintaining a sufficient level of subtransient reactance in a superconducting machine includes producing a stator assembly that includes at least one stator coil assembly having a first predefined length. The method produces a rotor assembly configured to rotate within the stator assembly and spaced from the stator assembly by a gap. This rotor assembly includes at least one superconducting rotor winding assembly that, in operation, generates a magnetic flux linking the stator assembly. The method positions an asynchronous field filtering shield, having a second predefined length that is less than the first predefined length, between the stator assembly and the rotor assembly. Further, if the size of the superconducting machine is to be minimized, the method may also reduce the gap between the stator assembly and the rotor assembly to the minimum allowed by mechanical considerations.

One or more of the following features may also be included. The method includes rigidly affixing the asynchronous field filtering shield to the rotor assembly or the stator assembly. The stator coil assembly includes a center section and a pair end-turn sections positioned at distal ends of the center section. The positioning an asynchronous field filtering shield includes: positioning the asynchronous field filtering shield between the center section of the stator coil assembly and the superconducting rotor winding assembly; and extending the end-turn sections of the at least one stator coil assembly beyond the asynchronous field filtering shield.

According to a further aspect of this invention, a stator assembly is configured to accept a superconducting rotor assembly having an asynchronous field filtering shield of a first predefined length. The stator assembly includes at least one stator coil assembly having a second predefined length, which is greater than the first predefined length. The shield is positioned between the stator assembly and the rotor assembly.

According to a further aspect of this invention, a superconducting rotating machine includes a stator assembly. This stator assembly includes at least one stator coil assembly having a center section and a pair end-turn sections positioned at distal ends of the center section. A superconducting rotor assembly is configured to rotate within the stator assembly and is spaced from the stator assembly by a gap. The rotor assembly includes an asynchronous field filtering shield positioned between the stator assembly and the rotor assembly. At least one of the end-turn sections of the at least one stator coil assembly is flared radially away from the asynchronous field filtering shield. This creates an expanded gap between the end-turn sections and the asynchronous field filtering shield.

One or more of the following features may also be included. The expanded gap is two to three times larger than the gap. The at least one stator coil assembly includes an inner surface and an outer surface. The inner surface is positioned proximate the asynchronous field filtering shield. The superconducting machine further includes a flux return path positioned circumferentially about the outer surface of the end turn sections of the at least one stator coil assembly. The flux return path is constructed of a magnetic material. The magnetic material is laminated sheet steel. The asynchronous field filtering shield is constructed of a non-magnetic material. The non-magnetic material is copper. The non-magnetic material is aluminum. The at least one stator coil assembly is constructed using a copper non-superconducting material. The superconducting rotor assembly includes at least one superconducting rotor winding assembly which, in operation, generates a magnetic flux linking the stator assembly. The at least one superconducting rotor winding assembly is constructed using a high-temperature superconducting material. The high temperature superconducting material is chosen from the group consisting of: thallium-barium-calcium-copper-oxide; bismuth-strontium-calcium-copper-oxide; mercury-barium-calcium-copper-oxide; and yttrium-barium-copper-oxide. The superconducting machine further includes a refrigeration system for cooling the superconducting rotor assembly. Both of the end-turn sections of the at least one stator coil assembly are flared radially away from the asynchronous field filtering shield. One of the end-turn sections of the at least one stator coil assembly is flared radially away from the asynchronous field filtering shield and the other end-turn section is non-flared. The non-flared end-turn section is coterminous with the asynchronous field filtering shield. The non-flared end-turn section extends past the asynchronous field filtering shield.

According to a further aspect of this invention, a superconducting rotating machine includes a stator assembly. The stator assembly includes at least one stator coil assembly having a first predefined length. The at least one stator coil assembly includes a center section and a pair end-turn sections positioned at distal ends of the center section. A superconducting rotor assembly is configured to rotate within the stator assembly and is spaced from the stator assembly by a gap. The rotor assembly includes an asynchronous field filtering shield having a second predefined length which is less than the first predefined length. The shield is positioned between the stator assembly and the rotor assembly. At least one of the end-turn sections of the at least one stator coil assembly is flared radially away from the asynchronous field filtering shield. This creates an expanded gap between the end-turn sections and the asynchronous field filtering shield.

One or more of the following features may also be included. The expanded gap is two to three times larger than the gap. The at least one stator coil assembly includes an inner surface and an outer surface. The inner surface is positioned proximate the asynchronous field filtering shield. The superconducting machine further includes a flux return path positioned circumferentially about the outer surface of the end turn sections of the at least one stator coil assembly. The flux return path is constructed of a magnetic material. The magnetic material is laminated sheet steel. The asynchronous field filtering shield is constructed of a non-magnetic material. The non-magnetic material is copper. The non-magnetic material is aluminum. The first predefined length is a differential length greater than the second predefined length. The differential length is a percentage of the first predefined length, a percentage of the second predefined length, or a fixed length. The at least one stator coil assembly is constructed using a copper non-superconducting material. The superconducting rotor assembly includes at least one superconducting rotor winding assembly which, in operation, generates a magnetic flux linking the stator assembly. The at least one superconducting rotor winding assembly is constructed using a high-temperature superconducting material. The high temperature superconducting material is chosen from the group consisting of: thallium-barium-calcium-copper-oxide; bismuth-strontium-calcium-copper-oxide; mercury-barium-calcium-copper-oxide; and yttrium-barium-copper-oxide. The superconducting machine further includes a refrigeration system for cooling the at least one superconducting rotor winding assembly. Both of the end-turn sections of the at least one stator coil assembly are flared radially away from the asynchronous field filtering shield. One of the end-turn sections of the at least one stator coil assembly is flared radially away from the asynchronous field filtering shield and the other end-turn section is non-flared. The non-flared end-turn section is coterminous with the asynchronous field filtering shield. The non-flared end-turn section extends past the asynchronous field filtering shield.

According to a further aspect of this invention, a method of maintaining a sufficient level of subtransient reactance while decreasing the size and cost of a superconducting machine includes producing a stator assembly. The stator assembly includes at least one stator coil assembly having a center section and a pair end-turn sections positioned at distal ends of the center section. The method produces a superconducting rotor assembly that is configured to rotate within the stator assembly and spaced from the stator assembly by a gap. The method then positions an asynchronous field filtering shield between the stator assembly and the rotor assembly. The method flares the end-turn sections of the at least one stator coil assembly radially away from the asynchronous field filtering shield, thus creating an expanded gap between the end-turn sections and the asynchronous field filtering shield. The method then reduces the gap between the stator assembly and the rotor assembly to the minimum allowed by mechanical considerations.

One or more of the following features may be included. The method rigidly affixes the asynchronous field filtering shield to the rotor assembly.

One or more advantages can be provided from the above aspects of the invention. The efficiency of superconducting machines can be increased by reducing the air gap between the stator assembly and the rotor assembly. This efficiency can be increased while maintaining acceptable levels of subtransient reactance. By maintaining an acceptable level of subtransient reactance, the braking torque experienced during system faults by this efficient superconducting machine can be maintained at a reasonable level. This reduction in braking torque simplifies the design criteria associated with the rotor's torque tube.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
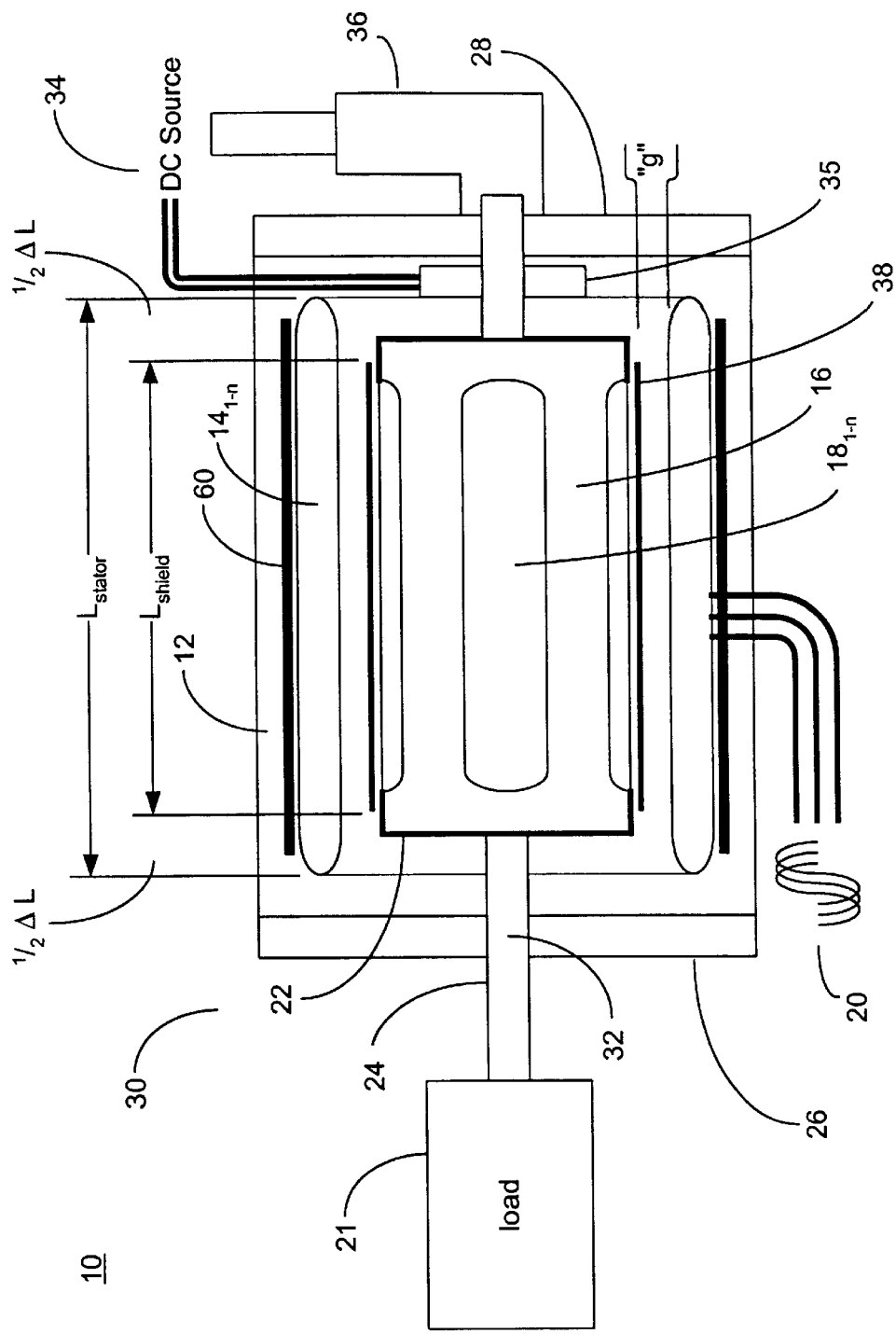
FIG. 1 is a cross-sectional side view of a superconducting rotating machine incorporating a first embodiment of this invention.

Referring to FIG. 1, a superconducting rotating machine 10 includes a stator assembly 12, which incorporates at least one stator coil assembly $14_{1-n}$. As is well known in the art, the specific number of stator coil assemblies $14_{1-n}$ incorporated into stator assembly 12 varies depending on various design criteria, such as whether the machine is a single phase or a polyphase machine. For example, in one 33,000 horsepower superconducting machine design, stator assembly 12 includes 180 stator coil assemblies $14_{1-n}$.

A rotor assembly 16 rotates within stator assembly 12. As with stator assembly 12, rotor assembly 16 includes at least one rotor winding assembly $18_{1-n}$. In the same 33,000 horsepower superconducting machine design, rotor assembly 16 includes 12 rotor winding assemblies $14_{1-n}$. These rotor winding assemblies, during operation, generate a magnetic flux that links rotor assembly 16 and stator assembly 12.

During operation of superconducting rotating machine 10, a balanced polyphase voltage 20 (typically a three-phase voltage) is supplied to stator coil assemblies $14_{1-n}$. This, in turn, brings machine 10 up to its operating speed, which is proportional to the frequency of supply voltage 20. Accordingly, if the frequency of supply voltage 20 is held constant, machine 10 (i.e., rotor assembly 16) will rotate at a constant (or synchronous) speed. The torque generated by this now-rotating rotor assembly 16 is transferred to a load 21 (e.g., a propeller shaft of a boat, a conveyor belt on a production line, the drive wheels of a diesel locomotive, etc.) via a torque tube 22 and an output shaft 24.

Output shaft 24 is supported by a pair of bearing plates 26, 28. The bearing plate 26 on the drive end 30 of superconducting rotating machine 10 contains a passage 32 through which output shaft 24 passes. Bearing plates 26, 28 position rotor assembly 16 at the proper position within stator assembly 12 so that rotor assembly 16 can freely rotate within stator assembly 12 while maintaining the proper gap "g" between these assembles.

During operation of superconducting rotating machine 10, field energy 34 is applied to rotor winding assembly $18_{1-n}$, through a slip ring/rotating disk assembly 35. This signal can be in the form of a DC current. Rotor winding assemblies $18_{1-n}$ require DC current to generate the magnetic field (and the magnetic flux) required to link the rotor assembly 16 and stator assembly 12. Therefore, if field energy 34 is supplied in the form of an AC current, a rectifier/thyristor circuit (not shown) will be employed to convert the AC current into a DC current.

While stator coil assemblies $14_{1-n}$ are non-superconducting copper coil assemblies, rotor winding assemblies $18_{1-n}$ are superconducting assemblies incorporating either HTS (High Temperature Superconductor) or LTS (Low Temperature Superconductor) windings. Examples of LTS conductors are: niobium-zirconium; niobium-titanium; and niobium-tin. Examples of HTS conductors are: thallium-barium-calcium-copper-oxide; bismuth-strontium-calcium-copper-oxide; mercury-barium-calcium-copper-oxide; and yttrium-barium-copper-oxide.

As these superconducting conductors only achieve their superconducting characteristics when operating at low temperatures, a refrigeration system 36 is incorporated into superconducting machine 10. As is known in the art, refrigeration system 36 is typically some form of cryogenic cooler that maintains the operating temperature of rotor winding assemblies $18_{1-n}$ at an operating temperature sufficiently low enough to enable the conductors to exhibit their superconducting characteristics. Since rotor winding assemblies $18_{1-n}$ must be kept cool by refrigeration system 36, torque tube 22 may be constructed from a high strength, low thermal conductivity composite material, such as G-10 phenolic or woven-glass epoxy.

Rotor assembly 16 includes an asynchronous field filtering shield 38 positioned between stator assembly 12 and rotor assembly 16. As rotor assembly 16 is typically cylindrical in shape, asynchronous field filtering shield 38 is also typically cylindrical in shape. Stator assembly 12 is typically powered by three-phase AC power 20 (typically at 60 Hertz). This, in turn, generates a rotating magnetic field that rotates about the axis of the cylindrically-shaped stator assembly 12. As stated above, the frequency of the three-phase AC power 20 supplied to stator assembly 12 proportionally controls the rotational speed of superconducting machine 10. Since AC signals naturally contain harmonics of their primary frequency (e.g., odd multiples of a 60 Hertz signal), it is desirable to shield the rotor winding assemblies $18_{1-n}$ of rotor assembly 16 from these asynchronous fields. Accordingly, asynchronous field filtering shield 38, which is fitted to rotor assembly 16, covers (or shields) rotor winding assemblies $18_{1-n}$ from the asynchronous fields generated as a result of these harmonics present in three-phase AC power 20. Asynchronous field filtering shield 38, which is constructed of a non-magnetic material (e.g., copper, aluminum, etc.), must be of a length ($L_{shield}$) sufficient to fully cover and shield rotor winding assemblies $18_{1-n}$. In a preferred embodiment, asynchronous field filtering shield 38 is constructed of 6061T6 structural aluminum. The thickness of shield 38 varies inversely with respect to the frequency of the three-phase AC power 20 supplied to stator assembly 12, which is typically in the range of 2–120 Hertz. Typically, the thickness of shield 38 varies from ½–3 inches depending on this supply frequency.

As stated above, a gap "g" exists between stator assembly 12 and rotor assembly 16 (which includes asynchronous field filtering shield 38). In order to reduce the size of superconducting rotating machine 10, it is desirable to reduce the dimensions of this gap or spacing to a minimum allowable value. In the same 33,000 horsepower superconducting machine, this gap "g" has a value of over one inch. Specifically, due to the maximization of the flux linkage, the size of machine 10 is minimized when gap "g" is minimized. Unfortunately, when gap "g" is minimized, shield 38 gets very close to the windings of stator coil assembly $14_{1-n}$. As is known in the art, whenever windings are placed in close proximity to a conductive surface, the apparent inductance (i.e., subtransient reactance) of those windings is reduced. This, in turn, elevates the level of braking torque experienced by rotor assembly 16 and torque tube 22 during a fault condition (e.g. all phases of stator assembly 12 being shorted to ground). In consideration of the fact that torque tube 22 may be constructed of a non-metallic thermally-insulating material, this elevated level of braking torque is a situation which should be avoided in a superconducting rotating machine 10.

Further, concerning the fault condition described above, it is important to note that a superconducting rotating machine 10 during a fault condition (i.e., all phases of stator assembly 12 shorted to ground) will essentially function as a generator. Further, as all the phases of the stator assembly 12 are shorted to ground, the subtransient reactance of the stator winding is the only impedance limiting the amount of current passing through those windings. Accordingly, as subtransient reactance is reduced toward zero, the maximum current circulating in stator assembly 12 during a fault condition approaches infinity. Therefore, while efficiency should be maximized, subtransient reactance cannot be lowered to unacceptable levels. The typical acceptable range for subtransient reactance is about 0.20 p.u. (per unit). Accordingly, gap "g" is typically determined empirically, in that the gap is adjusted until the desired level of subtransient reactance is achieved.

In order to maintain a high level of efficiency and an acceptable level of subtransient reactance, stator coil assemblies $14_{1-n}$ have a length ($L_{stator}$) that is greater than the length ($L_{shield}$) of asynchronous field filtering shield 38. Specifically, the difference between $L_{stator}$ and $L_{shield}$ is differential length ($\Delta$ L). Typically, $\Delta$ L is evenly distributed on each end of rotor assembly 16 (as shown in FIG. 1). However, this is not intended to be a limitation of the invention, as it is possible to split $\Delta$ L in an uneven fashion.

This differential length ($\Delta$ L) can be a predefined length or a percentage of either $L_{stator}$ or $L_{shield}$. Typical embodiments of these values are: 3 inches (for a predefined length); 9–18% (for a percentage of $L_{shield}$); and 8–16% (for a percentage of $L_{stator}$). By allowing the ends of the stator coil assemblies $14_{1-n}$ to extend beyond the ends of asynchronous field filtering shield 38, a larger subtransient reactance is created which, as described above, limits the braking torque and peak current experienced during a stator fault condition.

Stator coil assemblies $14_{1-n}$ each have an inner surface and an outer surface. The inner surface faces toward asynchronous field filtering shield 38 and the outer surface faces away from asynchronous field filtering shield 38. A flux return path 60 circumferentially surrounds the outer surface of stator coil assemblies $14_{1-n}$, thus forming a cylindrical structure that covers the outer surface of these stator coil assemblies $14_{1-n}$. Flux return path 60 is constructed of a magnetic material, such as laminated sheet steel, and is typically between one and two inches thick. Typically, the machine axial length of flux return path 60 is determined empirically, in that the machine axial length is adjusted until the desired level of subtransient reactance is achieved. The use of this flux return path 60 enhances the magnetic flux leakage for stator coil assemblies $14_{1-n}$. This, in turn, maintains an acceptable level of subtransient reactance.

Figure 2:
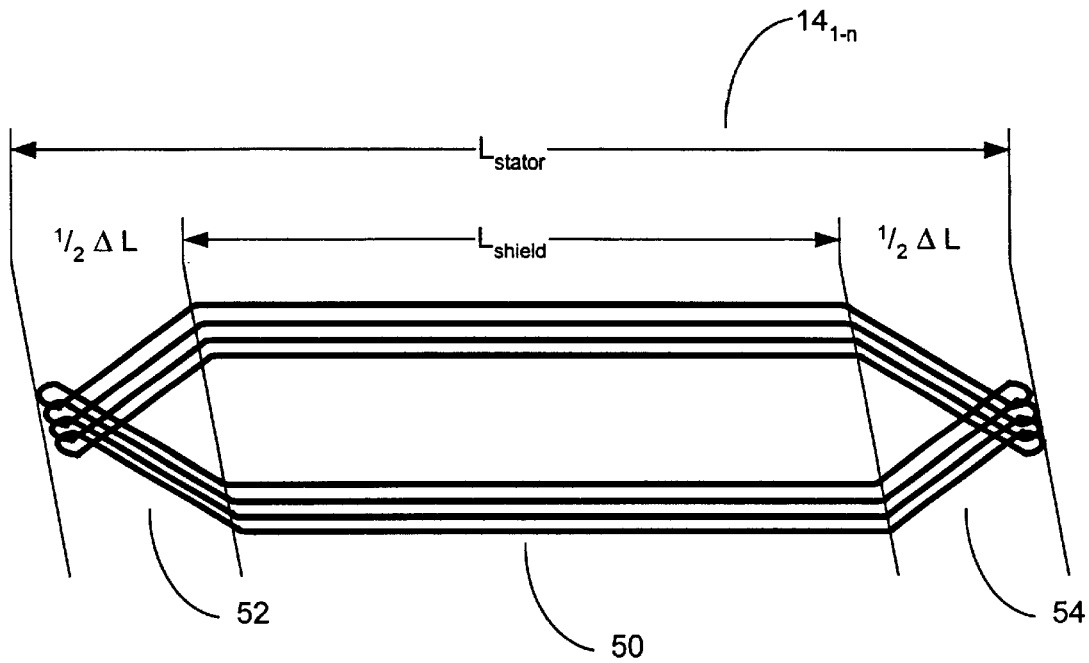
FIG. 2 is an isometric view of a stator coil assembly incorporating the first embodiment of this invention.

Referring to FIGS. 1 and 2, stator coil assemblies $14_{1-n}$ are typically shaped in the form of diamond end turns typically employed in the motor industry. Accordingly, each stator coil assembly $14_{1-n}$ includes a center section 50 and a pair of end-turn sections 52, 54 at the distal ends of center section 50. Asynchronous field filtering shield 38 is positioned between center section 50 and rotor winding assemblies $18_{1-n}$, and end-turn sections 52, 54 are the portions ($\Delta$ L) of the stator coil assemblies $14_{1-n}$ that extend past the ends of asynchronous field filtering shield 38. Accordingly, in this particular example, the differential length ($\Delta$ L) is evenly distributed on each end of rotor assembly 16. However, as stated above, this is not intended to be a limitation of this invention, as the differential length ($\Delta$ L) need not be evenly distributed.

Figure 3:
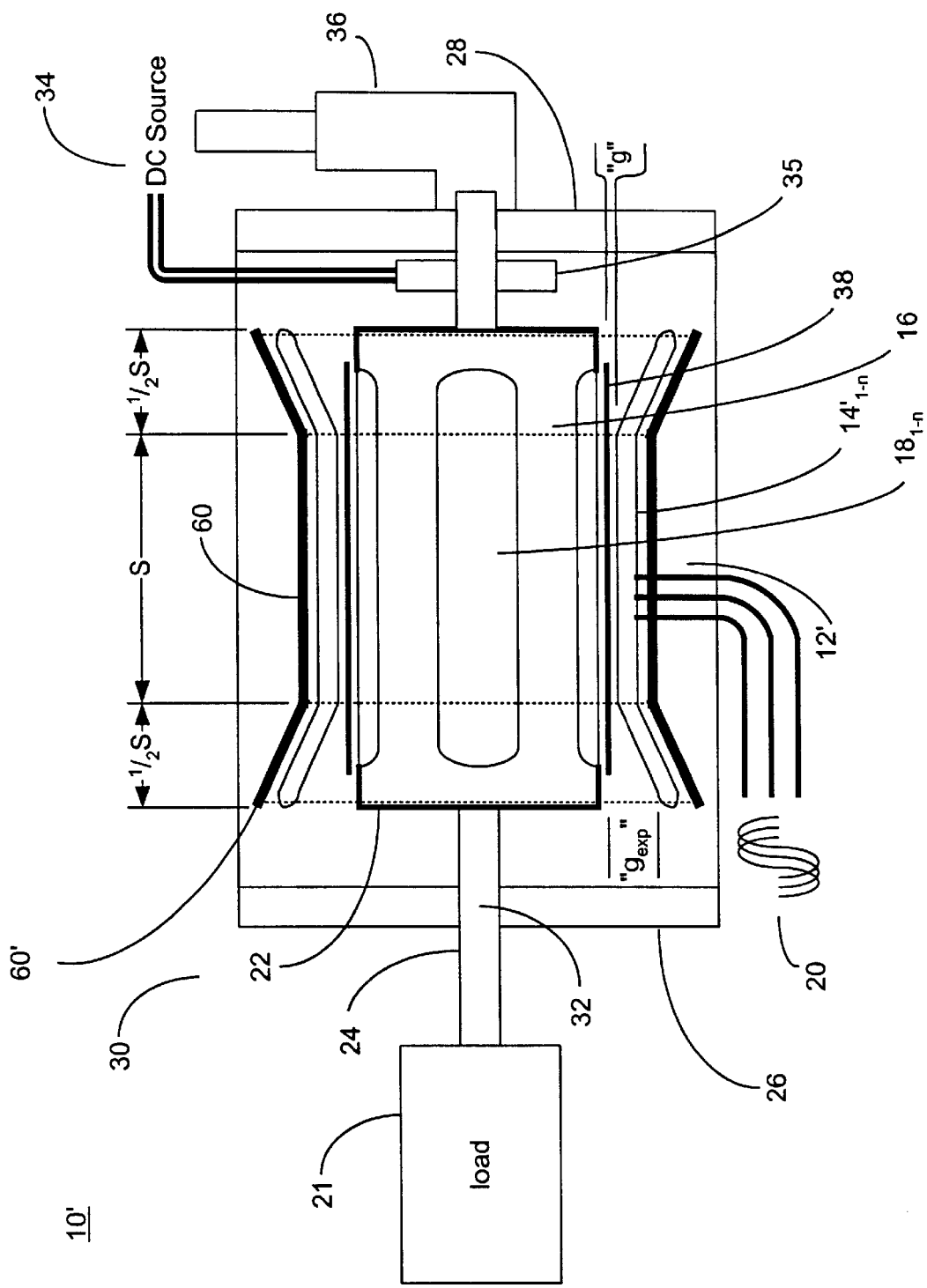
FIG. 3 is a cross-sectional side view of a superconducting rotating machine incorporating a second embodiment of this invention.
Figure 4:
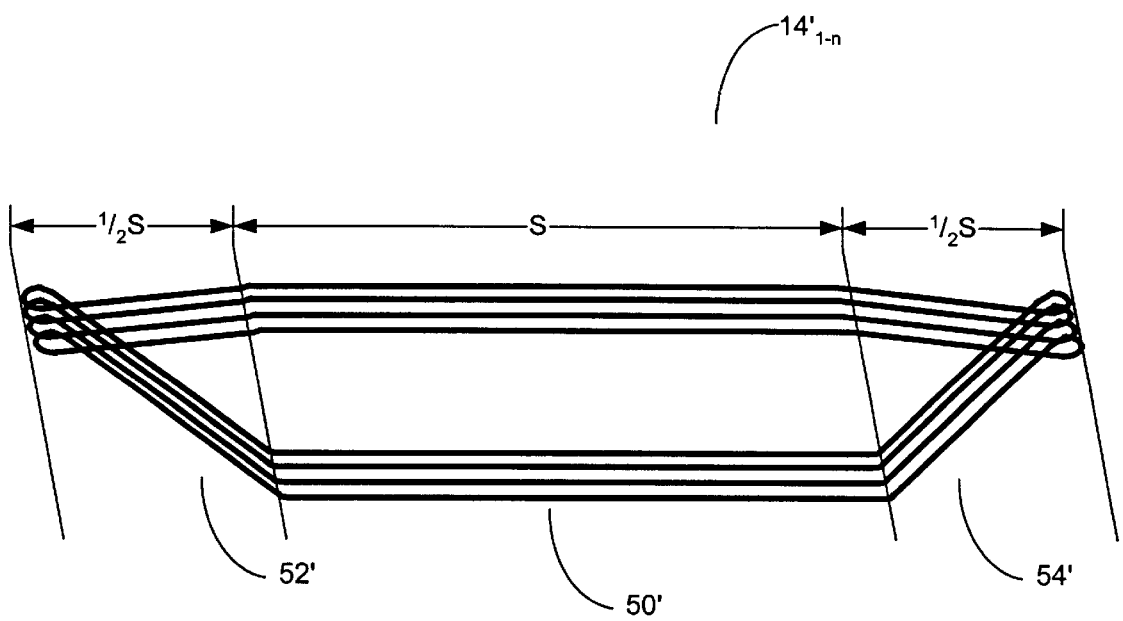
FIG. 4 is an isometric view of a stator coil assembly incorporating the second embodiment of this invention.

Referring to FIGS. 3 and 4, there is shown an alternative embodiment of this invention. Stator assembly 12' includes at least one stator coil assembly $14'_{1-n}$, each of which includes a center section 50' and a pair of end-turn sections 52', 54' at the distal ends of center section 50'. A superconducting rotor assembly 16 is configured to rotate within the stator assembly 12' and is spaced from stator assembly 12' by a gap "g". Superconducting rotor assembly 16 includes an asynchronous field filtering shield 38 positioned between the stator assembly 12' and the superconducting rotor assembly 16. Asynchronous field filtering shield 38 is generally cylindrical in shape and is rigidly attached to and surrounds the superconducting rotor assembly 16.

The end turn sections 52' and 54' of the stator coil assemblies $14'_{1-n}$ are flared radially away from asynchronous field filtering shield 38. This flaring begins at the beginning of the end-turn section (i.e., the point at which the particular end-turn section 52' or 54' meets center section 50') and continues until the end of the end turn section. Typically, these end turn sections 52' and 54' are each approximately half the length of the center section 50' of the stator coil assembly $14'_{1-n}$. This flaring results in an expanded gap "$g_{exp}$" occurring at the end of the end-turn sections 52' and 54'. This expanded gap "$g_{exp}$" is typically two to three times greater than the gap "g" present between the center section 50' of the stator coil assemblies $14'_{1-n}$ and the superconducting rotor assembly 16. Typically, the size of this expanded gap "$g_{exp}$" (and, therefore, the angle of the flare) is determined empirically, in that the size of the expanded gap is adjusted until the desired level of subtransient reactance is achieved. In the same 33,000 horsepower machine, the expanded gap would be approximately two inches. This expanded gap enables superconducting machine 10' to maintain a high level of efficiency and an acceptable level of subtransient reactance.

Stator coil assemblies $14'_{1-n}$ each have an inner surface and an outer surface. The inner surface (the convex surface) faces toward asynchronous field filtering shield 38 and the outer surface (the concave surface) faces away from asynchronous field filtering shield 38. A flux return path 60' (in combination with flux return path 60) circumferentially surrounds the outer surface of end turn sections 52' and 54' and center section 50', thus forming a flared cylindrical structure that covers the outer surface of these sections 50', 52' and 54'. Please note that the flared portions 60' of the flux return path are optional and may be omitted. Flux return path 60' is constructed of a magnetic material, such as laminated sheet steel, and is typically between one and two inches thick. Typically, the machine axial length of flux return path 60' is determined empirically, in that the machine axial length is adjusted until the desired level of subtransient reactance is achieved. The use of this flux return path 60' enhances the magnetic flux leakage for stator coil assemblies $14'_{1-n}$. This, in turn, maintains an acceptable level of subtransient reactance.

Figure 5:
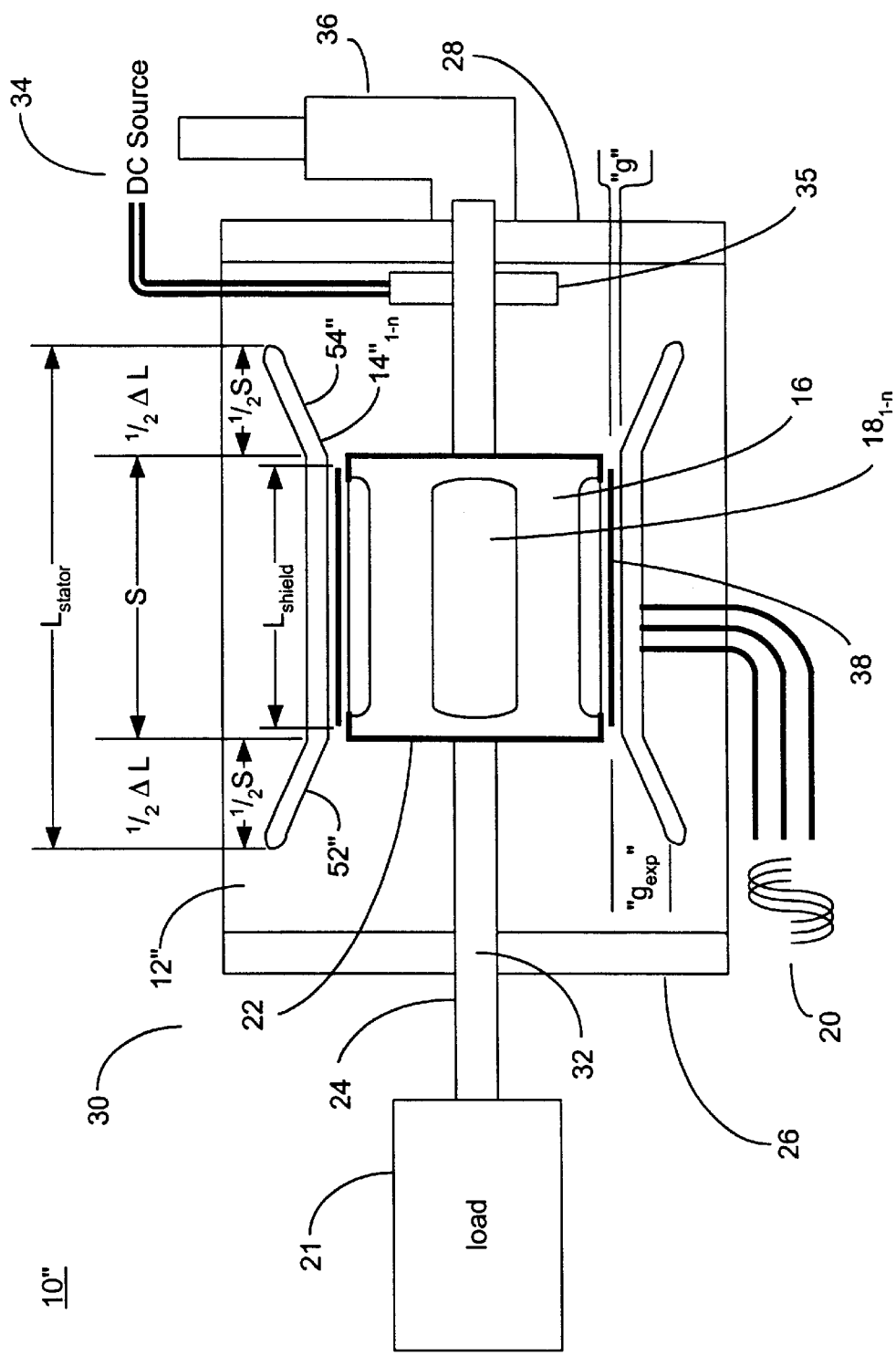
FIG. 5 is a cross-sectional view of a superconducting rotating machine incorporating the first and second embodiments of this invention.

Referring to FIG. 5, there is shown an alternative embodiment of this invention. Specifically, there is shown a superconducting machine 10" that includes a stator assembly 12". This stator assembly 12" includes stator coil assemblies $14"_{1-n}$ that have flared end turn sections 52" and 54" that extend past each end of asynchronous field filtering shield 38 by one-half of the differential length (½ Δ L). As stated above, by extending these end-turn sections 52" and 54" past the end of asynchronous field filtering shield 38, subtransient reactance is enhanced. Further, as described above, by flaring the end-turn sections 52" and 54" radially away from asynchronous field filter shield 38, subtransient reactance is enhanced. Therefore, gap "g" can be further reduced without subtransient reactance dropping to unacceptable levels. In this particular embodiment, a flux return path (not shown for clarity reasons, such as path 60, FIG. 1) may also be included to further enhance the magnetic flux leakage, thus enhancing subtransient reactance.

Figure 6:
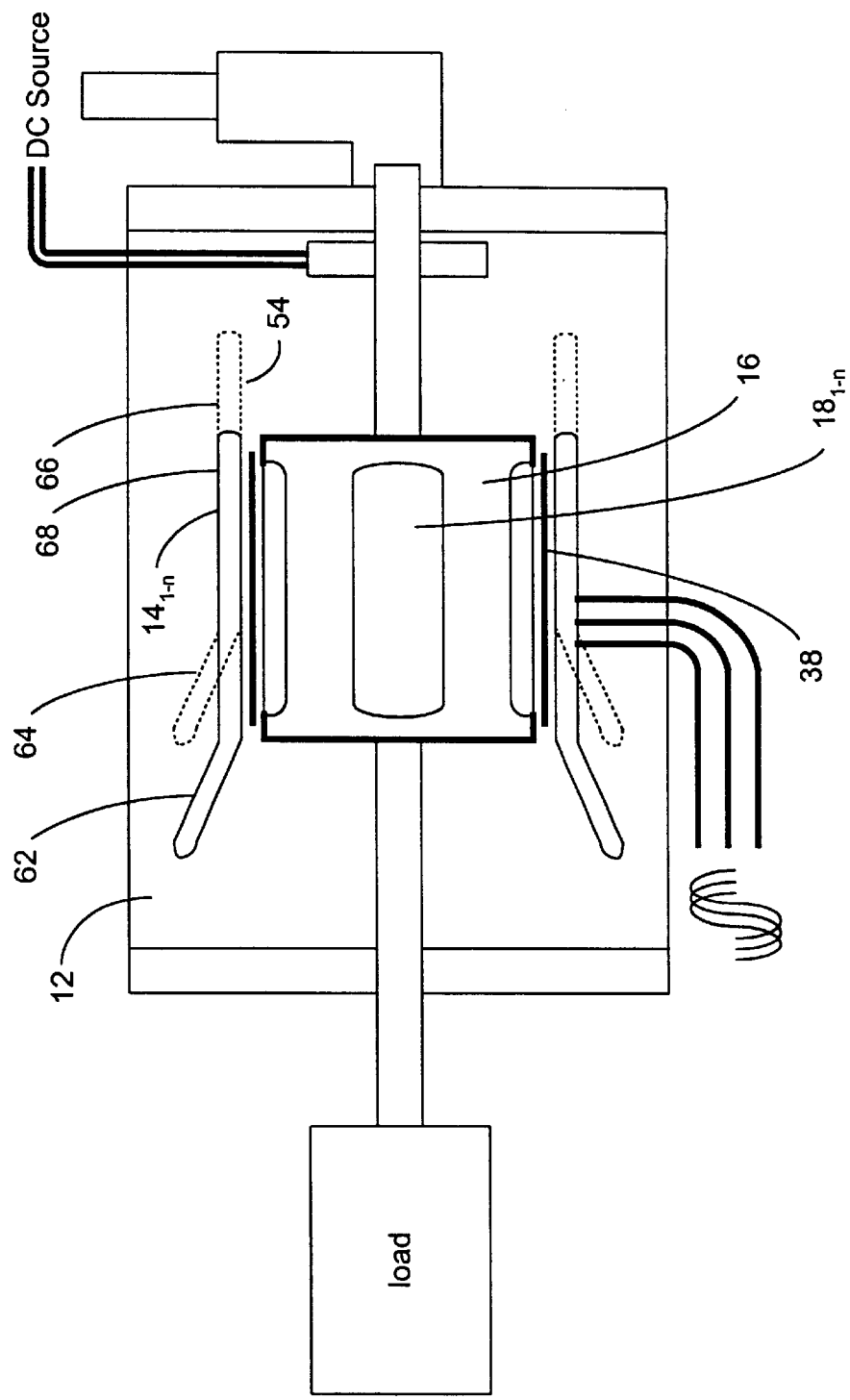
FIG. 6 is a cross-sectional view of a superconducting rotating machine showing various end-turn section configurations.

Referring to FIG. 6, there is shown various end-turn section configurations for stator coil assemblies $14_{1-n}$. While thus far, we have shown stator coil assemblies in which the end-turn sections were the same on both side, this is not intended to be a limitation of the inventions, as these various end-turn sections can be mixed to achieved the desired level of subtransient reactance. Specifically, the stator coil assemblies $14_{1-n}$ of stator 12 of superconducting machine 10 can include: (a) flared/extended end-turn sections 62 which are both flared away from asynchronous field filter shield 38 and extend past the end of shield 38; (b) flared/non-extended end-turn sections 64 (shown in phantom) which only flare away from shield 38; (c) non-flared/extended end-turn sections 66 (shown in phantom) which only extend past the end of shield 38; or (d) non-flared/non-extended end-turn sections 68 which do not flare away from shield 38 and do not extend past shield 38 (i.e. a conterminous end-turn section since it terminates at the end of shield 38).

Figure 7:
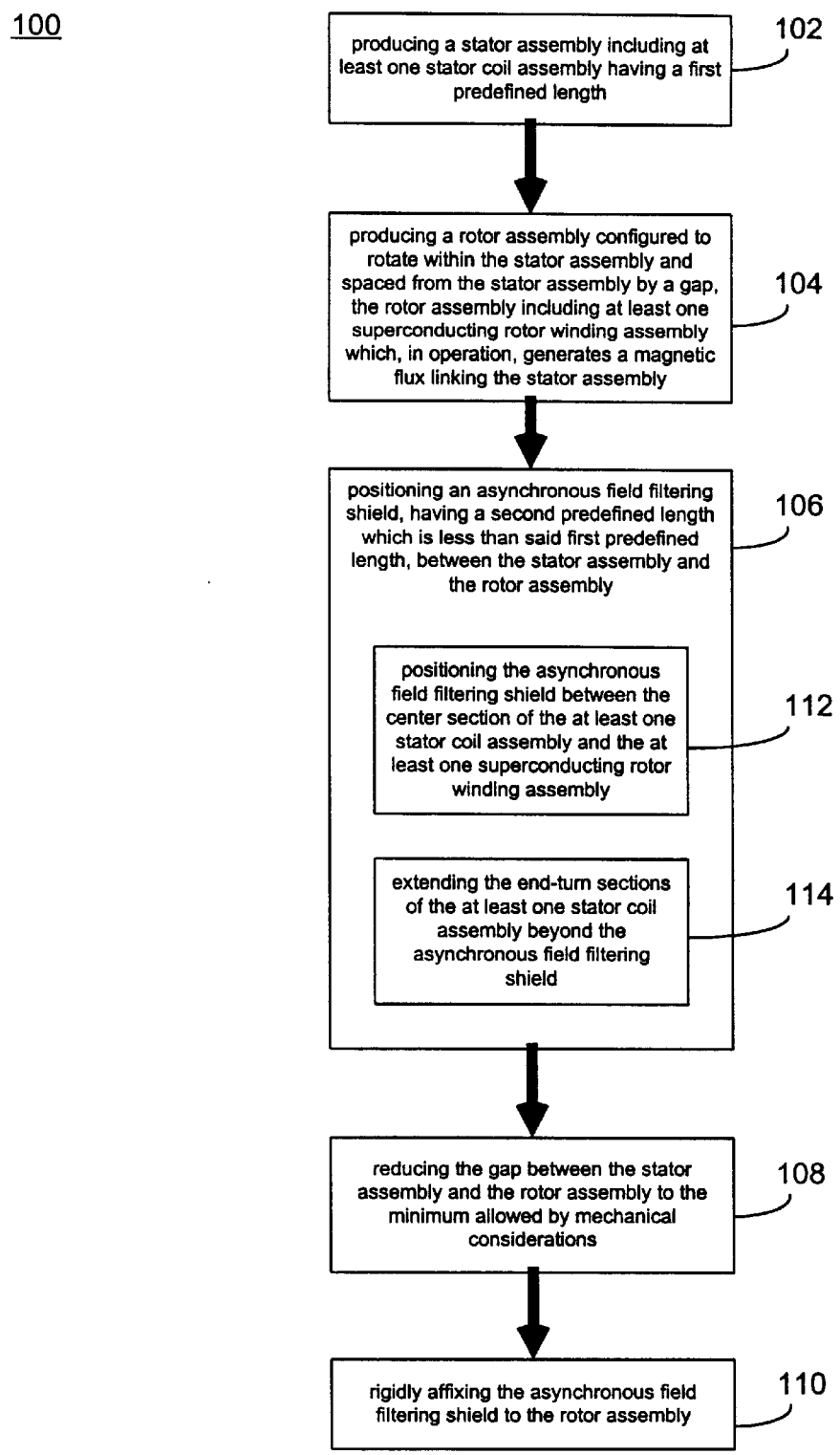
FIG. 7 is a flow chart of a method for maintaining a sufficient level of subtransient reactance while increasing the efficiency of a superconducting machine.

Referring to FIG. 7, there is shown a method 100 for maintaining a sufficient level of subtransient reactance while reducing the size of a superconducting machine. Method 100 produces 102 a stator assembly including at least one stator coil assembly having a first predefined length and produces 104 a rotor assembly configured to rotate within the stator assembly and spaced from the stator assembly by a gap. The rotor assembly includes at least one superconducting rotor winding assembly that, in operation, generates a magnetic flux linking the stator assembly. Method 100 positions 106 an asynchronous field filtering shield, having a second predefined length which is less than said first predefined length, between the stator assembly and the rotor assembly. The gap between the stator assembly and the rotor assembly is then reduced 108 by method 100 to the minimum allowed by mechanical considerations.

Method 100 rigidly affixes 110 the asynchronous field filtering shield to the rotor assembly. Each stator coil assembly includes a center section and a pair end-turn sections positioned at distal ends of the center section. Positioning 106 the asynchronous field filtering shield includes positioning 112 the asynchronous field filtering shield between the center section of the at least one stator coil assembly and the at least one superconducting rotor winding assembly, and extending 114 the end-turn sections of the at least one stator coil assembly beyond the asynchronous field filtering shield.

Figure 8:
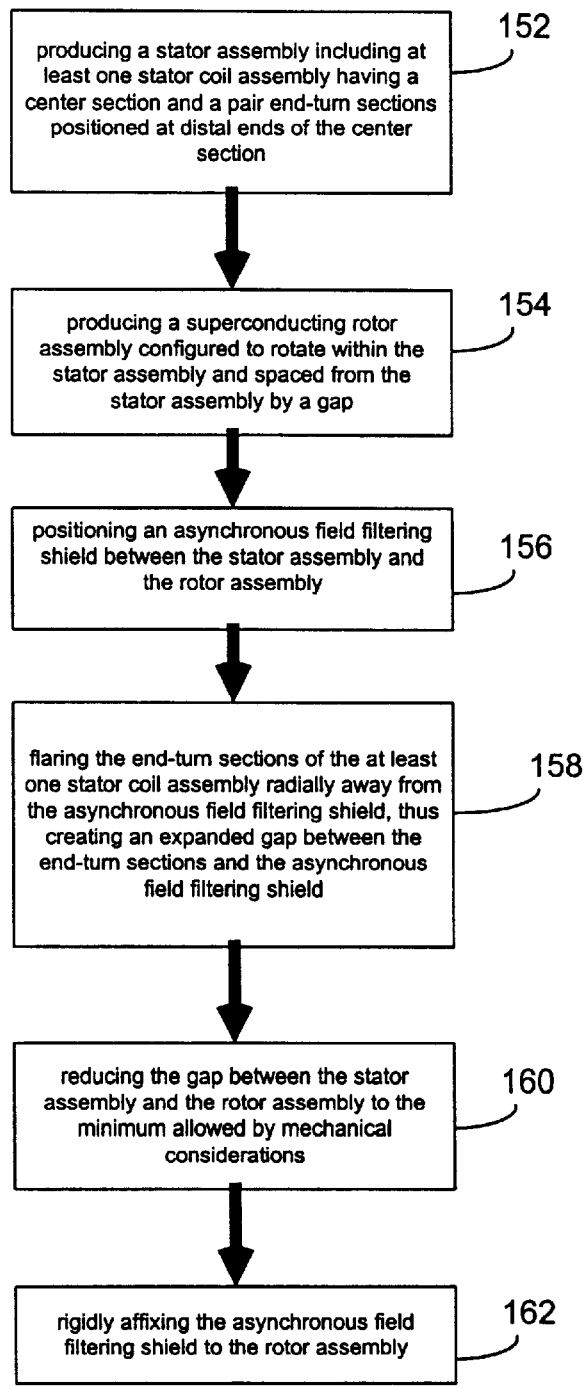
FIG. 8 is a flow chart of another method for maintaining a sufficient level of subtransient reactance while increasing the efficiency of a superconducting machine.

Referring to FIG. 8, there is shown a method 150 for maintaining a sufficient level of subtransient reactance while decreasing the size and cost of a superconducting machine. Method 150 produces 152 a stator assembly including at least one stator coil assembly having a center section and a pair end-turn sections positioned at distal ends of the center section. Method 150 then produces 154 a superconducting rotor assembly configured to rotate within the stator assembly and spaced from the stator assembly by a gap. Method 150 positions 156 an asynchronous field filtering shield between the stator assembly and the rotor assembly. Method 150 then flares 158 the end-turn sections of the at least one stator coil assembly radially away from the asynchronous field filtering shield, thus creating an expanded gap between the end-turn sections and the asynchronous field filtering shield. The gap between the stator assembly and the rotor assembly is then reduced 160 to the minimum allowed by mechanical considerations.

Method 150 then rigidly affixes 162 the asynchronous field filtering shield to the rotor assembly.

A number of embodiments of the invention have been described. Nevertheless, it will be understood that various modifications may be made without departing from the spirit and scope of the invention. Accordingly, other embodiments are within the scope of the following claims.

What is claimed is:

1. A method of maintaining a desired level of sub-transient reactance in a superconducting machine comprising:

specifying a desired level of sub-transient reactance;

producing a stator assembly including at least one stator coil assembly having a first predefined length;

producing a rotor assembly configured to rotate within the stator assembly; and positioning an asynchronous field filtering shield, having a second predefined length that is less than said first predefined length, between the stator assembly and the rotor assembly;

wherein one of the first and second predefined lengths is adjusted to achieve the desired level of sub-transient reactance.

2. The method of claim 1 further comprising rigidly affixing the asynchronous field filtering shield to the rotor assembly.

3. The method of claim 1 wherein the at least one stator coil assembly includes a center section and a pair of end-turn sections positioned at distal ends of the center section, and positioning an asynchronous field filtering shield includes:

positioning the asynchronous field filtering shield between the center section of the at least one stator coil assembly and the rotor assembly; and extending the end-turn sections of the at least one stator coil assembly beyond the asynchronous field filtering shield.

4. A method of maintaining a desired level of sub-transient reactance comprising:

specifying a desired level of sub-transient reactance;

producing a stator assembly including at least one stator coil assembly having a first predefined length and including a center section and a pair of end-turn sections positioned at distal ends of the center section;

producing a rotor assembly configured to rotate within the stator assembly;

positioning an asynchronous field filtering shield, having a second predefined length which is less than said first predefined length, between the stator assembly and the rotor assembly; and flaring the end-turn sections of the at least one stator coil assembly radially away from the asynchronous field filtering shield, thus creating an expanded gap between the end-turn sections and the asynchronous field filtering shield;

wherein one of the first and second predefined lengths is adjusted to achieve the desired level of sub-transient reactance.

5. The method of claim 4 further comprising rigidly affixing the asynchronous field filtering shield to the rotor assembly.

6. The method of claim 4 further comprising positioning a flux return path circumferentially about the outer surface of the end turn sections of the at least one stator coil assembly.

* * * * *